US008437521B2

(12) United States Patent
Lu et al.

(10) Patent No.: US 8,437,521 B2
(45) Date of Patent: May 7, 2013

(54) SYSTEMS AND METHODS FOR AUTOMATIC VERTEBRA EDGE DETECTION, SEGMENTATION AND IDENTIFICATION IN 3D IMAGING

(75) Inventors: Le Lu, Chalfont, PA (US); Jun Ma, Towson, MD (US); Marcos Salganicoff, Bala Cynwyd, PA (US); Yiqiang Zhan, Berwyn, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 393 days.

(21) Appl. No.: 12/879,434

(22) Filed: Sep. 10, 2010

(65) Prior Publication Data

US 2011/0058720 A1  Mar. 10, 2011

Related U.S. Application Data

(60) Provisional application No. 61/241,221, filed on Sep. 10, 2009.

(51) Int. Cl.
*G06K 9/00* (2006.01)

(52) U.S. Cl.
USPC ........... 382/128; 382/173; 382/181; 382/190; 382/203

(58) Field of Classification Search .................. None
See application file for complete search history.

(56) References Cited

U.S. PATENT DOCUMENTS

| | | | |
|---|---|---|---|
| 7,916,917 B2 * | 3/2011 | Dewaele et al. | 382/128 |
| 8,019,133 B2 * | 9/2011 | Knoplioch et al. | 382/128 |
| 2008/0211812 A1 | 9/2008 | Barbu et al. | |
| 2008/0240564 A1 * | 10/2008 | Sun et al. | 382/175 |
| 2008/0279429 A1 * | 11/2008 | Fradkin et al. | 382/128 |
| 2009/0202150 A1 * | 8/2009 | Fradkin et al. | 382/173 |
| 2009/0226057 A1 * | 9/2009 | Mashiach et al. | 382/128 |

OTHER PUBLICATIONS

Piotr Dollar et al., "Supervised Learning of Edges and Object Boundaries", IEEE Conference on Computer Vision and Pattern Recognition, New York, USA, 2006.
Yiqiang Zhan and Dinggang Shen, "Deformable Segmentation of 3-D Ultrasound Prostate Images Using Statistical Texture Matching Method", IEEE Transactions on Medical Imaging, vol. 25, No. 3, Mar. 2006.
K. Murphy et al., "A large-scale evaluation of automatic pulmonary nodule detection in chest CT using local image features and k-nearest-neighbour classification", Medical Image Analysis 13 (2009) 757-770.
Le Lu, et al., "Simultaneous Detection and Registration for Ileo-Cecal Valve Detection in 3D CT Colonography", European Conference of Computer Vision, Marshel, France, 2008.

(Continued)

*Primary Examiner* — Matthew Bella
*Assistant Examiner* — Jason Heidemann
(74) *Attorney, Agent, or Firm* — Peter R. Withstandley

(57) ABSTRACT

Systems and methods for automatic accurate and efficient segmentation and identification of one or more vertebra in digital medical images using a coarse-to-fine segmentation.

16 Claims, 10 Drawing Sheets

OTHER PUBLICATIONS

Yefeng Zheng, et al., "Four-Chamber Heart Modeling and Automatic Segmentation for 3D Cardiac CT Volumes Using Marginal Space Learning and Steerable Features", IEEE Transactions on Medical Imaging, vol. 27, Nov. 2008, pp. 1668-1681.

Tobias Klinder et al., "Automated model-based vertebra detection, identification and segmentation in CT images", Medical Image Analysis 13 (2009) 471-482.

Jianhua Yao, et al., "Automated Spinal Column Extraction and Partitioning", Biomedical Imaging: Nano to Macro, 2006, 3rd IEEE International Symposium, pp. 390-393.

William E. Lorensen and Harvey E. Cline, "Marching Cubes: A High Resolution 3D Surface Construction Algorithm", Computer Graphics, 1987.

Jeannette Herring and Benoit M. Dawant, "Automatic Lumbar Vertebral Identification Using Surface-Based Registration", Journal of Biomedical Informatics 34, 74-84 (2001).

Zhigang Peng, et al., "Automated Vertebra Detection and Segmentation from the Whole Spine MR Images", Proceedings of the 2005 IEEE Engineering in Medicine and Biology 27th Annual Conference, Shanghai, China, Sep. 1-4, 2005, pp. 2527-2530.

Hong Shen, et al., "Localized Priors for the Precise Segmentation of Individual Vertebras from CT Volume Data", Medical Image Computing and Computer-Assisted Intervention—MICCAI 2008, Lecture Notes in Computer Science, 2008, vol. 5241/2008, 367-375.

* cited by examiner

SYSTEMS AND METHODS FOR AUTOMATIC VERTEBRA EDGE DETECTION, SEGMENTATION AND IDENTIFICATION IN 3D IMAGING

CROSS-REFERENCE TO RELATED APPLICATION

The present application is a utility application, which claims the benefit of U.S. Provisional Application No. 61/241,221, filed Sep. 10, 2009, which is hereby incorporated herein by reference in its entirety.

TECHNICAL FIELD

The present disclosure relates to computer-aided diagnosis systems and methods and, more specifically, to improved systems and methods for detection, segmentation, and identification of vertebrae in three-dimensional imaging.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical structures such as cysts, tumors, polyps, etc. Given the amount of image data generated by any given image scan; it is preferable that an automatic technique should point out anatomical features in the selected regions of an image to a doctor for further diagnosis of any disease or condition.

One general method of automatic image processing employs feature based recognition techniques to determine the presence of anatomical structures in medical images. However, feature based recognition techniques can suffer from accuracy problems.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images.

One particular area in which the use of CAD systems would be highly advantageous is in the imaging of the spinal column. A precise vertebra segmentation and identification method is in high demand due to its importance to, and impact on, many orthopedic, neurological, and ontological applications. Unfortunately, the task of segmenting and identifying vertebrae, even using CAD systems that are well-developed for other anatomical structures, often proves inaccurate and therefore inadequate. The difficulty lies in the inherent complexity of vertebrae. Each vertebra can be modeled against the same vertebra in other patients and an average, or mean vertebra model can be created. However, the variation within the same class of vertebra as well as the variation in neighboring structures makes vertebral modeling and imaging extremely difficult.

Several methods have been reported addressing segmentation and/or identification of vertebra using a wide variety of different imaging modalities (e.g., magnetic resonance imaging (MRI), computed tomography (CT), etc.). Such prior approaches include a method to automatically extract and partition the spinal cord in CT images as described in Yao, J., O'Conner, S., Summers, R.: *Automated Spinal Column Extraction and Partitioning*. In: Proc. of IEEE ISM, pp. 390-393 (2006), which is hereby incorporated by reference herein. Another prior approach includes using a surface-based registration for automatic lumbar vertebra identification as described in Herring, J., Dawant, B.: *Automatic Lumbar Vertebral Identification Using Surface-Based Registration*. Computers and Biomedical Research 34(2), 629-642 (2001), which is hereby incorporated by reference in its entirety.

More recent approaches propose a model-based solution for vertebral detection, segmentation, and identification in CT images, as described, for example, in Klinder, T., Ostermatm, J., Ehm, M., Franz, A., Kneser, R., Lorenz, C.: *Automated Model-Based Vertebra Detection, Identification, and Segmentation in CT Images*. Medical Image Analysis 13, 471-481 (2009), which is hereby incorporated by reference herein. The approach described in Klinder achieved competitive identification rates of approximately 70% when identifying a single vertebra and 100% when identifying 16 or more vertebrae. However, that identification algorithm is based on vertebral appearance model (i.e., average volume block) spatial registration and matching which is extremely computationally consuming. In order to achieve the high identification rates of the Klinder approach requires approximately 20-30 minutes of computational time. In a real-world hospital setting, such system dedication to a single patient's data is not practical or realistic.

Therefore there is a need for systems and methods for precise segmentation and identification of vertebrae that is both accurate and efficient.

SUMMARY OF THE INVENTION

According to an aspect of the present disclosure, a system for automated segmentation of anatomical structures in image data is provided, including a digital image input for receiving at least one digital image of an anatomical structure, a storage device, coupled to the image input for storing the at least one digital image, and a processor coupled to the storage device. The processor being configured to receive the at least one digital image, analyze the at least one digital image and automatically locate at least one anatomical landmark, select a template from a database of pre-defined templates based upon the at least one anatomical landmark, and segment the at least one digital image by applying a coarse segmentation and a fine segmentation to obtain an optimized segmented template. Applying the coarse segmentation comprises, for each of a plurality of sub-regions of the anatomical structure, applying a corresponding sub-region of the selected template to the anatomical structure, calculating a first edge response, deforming the sub-region of the selected template, calculating a deformation edge response, selecting the sub-region or deformed sub-region of the template having a highest edge response, and combining the highest edge-response sub-region from each of the plurality of sub-regions into a single coarse-segmented template. Applying the fine segmentation comprises, for each of a plurality of patches of the coarse-segmented template, calculating an edge-response of the patch relative to the anatomical structure, deforming the patch, calculating an edge-response of the deformed patch, selecting the patch or deformed patch having a highest edge-response, and combining the highest edge-response patches into a single optimized segmented template. The digital image can be at a three-dimensional (3D) image, and the template can be a 3D surface template. Receiving the digital image can include acquiring the image using an imager selected from: computer tomography (CT), positron emission tomography (PET), single photon emission computed tomography (SPECT), magnetic resonance (MR), and ultrasound. Selecting a template can include selecting a template from a database of pre-defined templates based upon the at least one anatomical landmark, performing a plurality of rigid transformation on the selected template, calculating a fit response for each transformed template, and selecting a transformed template having a highest fit response. Deforming the template can include performing a plurality of translations of the template along each of the x, y, and z axes, performing a plurality of re-scalings of the template along each of the x, y, and z axes, and performing a plurality of rotations of the template along each of the x, y, and z axes. Subsequent to combining the highest edge-response sub-region from each of the plurality of sub-regions, the processor can perform a smoothing operation to smooth the single coarse-segmented template. Deforming the patch can include calculating a mean normal for the patch, and deforming the patch along the mean normal. Subsequent to combining the highest edge-response patches, the processor can perform a smoothing operation to smooth the single optimized segmented template.

According to another aspect of the present disclosure, a method for automated segmentation of anatomical structures in image data is provided, including acquiring at least one medical image of an anatomical structure, automatically locating at least one anatomical landmark in the at least one medical image, selecting a template from a database of pre-defined templates based at least in part on the at least one anatomical landmark, and segmenting the at least one medical image by applying a coarse segmentation and a fine segmentation to obtain an optimized segmented template. Applying the coarse segmentation can include, for each of a plurality of sub-regions of the anatomical structure, applying a corresponding sub-region of the selected template to the image of the anatomical structure, calculating a first edge-response, deforming the sub-region of the selected template, calculating a deformation edge-response, selecting the sub-region or deformed sub-region of the template having a highest edge-response, and combining the highest edge response sub-region from each of the plurality of sub-regions into a single coarse-segmented template. Applying a fine segmentation can include, for each of a plurality of patches of the coarse-segmented template, calculating an edge-response of the patch relative to the anatomical structure, deforming the patch, calculating an edge-response of the deformed patch, selecting the patch or deformed patch having a highest edge-response, and combining the highest edge-response patches into a single optimized segmented template. The digital image can be at least one three-dimensional (3D) image. Acquiring the digital image can include acquiring the image using an imaging technique selected from: computer tomography (CT), positron emission tomography (PET), single photon emission computed tomography (SPECT), magnetic resonance (MR), and ultrasound. Selecting a template can include selecting a template from a database of pre-defined templates based at least in part on the at least one anatomical landmark, performing a plurality of rigid transformation on the selected template, calculating a fit response for each transformed template, and selecting a transformed template having a highest fit response. Deforming the template can include performing a plurality of translations of the template along each of the x, y, and z axes, performing a plurality of re-scalings of the template along each of the x, y, and z axes, and performing a plurality of rotations of the template along each of the x, y, and z axes. Subsequent to combining the highest edge-response sub-region from each of the plurality of sub-regions, a smoothing operation can be performed to smooth the single coarse-segmented template. Deforming the patch can include calculating a mean normal for the patch, and deforming the patch along the mean normal. Subsequent to combining the highest edge-response patches, a smoothing operation can be performed to smooth the single optimized segmented template.

According to yet another aspect of the present disclosure, a system for automated identification of vertebrae in image data is provided, including a digital image input for receiving at least one digital image of at least one vertebra, a storage device, coupled to the image input for storing the at least one digital image, and a processor coupled to the storage device. The processor being configured to receive the at least one digital image, analyze the at least one digital image and automatically locate a plurality of anatomical landmarks, calculate a correspondence for each vertebra in the digital image based at least in part upon the plurality of anatomical landmarks, and relative to each of a plurality of pre-defined mean vertebra models, and identify each vertebra in the digital image based on a highest correspondence to a pre-defined mean vertebra model. The vertebra can be a thoracic vertebra, and the plurality of pre-defined mean vertebra models can be twelve thoracic vertebra models.

According to another aspect of the present disclosure, a method for automated identification of vertebrae in image data is provided, including receiving at least one digital image of at least one vertebra, analyzing the at least one digital image and automatically locate a plurality of anatomical landmarks, calculating a correspondence for each vertebra in the digital image based at least in part upon the plurality of anatomical landmarks, and relative to each of a plurality of pre-defined mean vertebra models, and identifying each vertebra in the digital image based on a highest correspondence to a pre-defined mean vertebra model. The at least one vertebra can be a thoracic vertebra, and the plurality of pre-defined mean vertebra models can be twelve thoracic vertebra models.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION OF THE INVENTION

Figure 1:
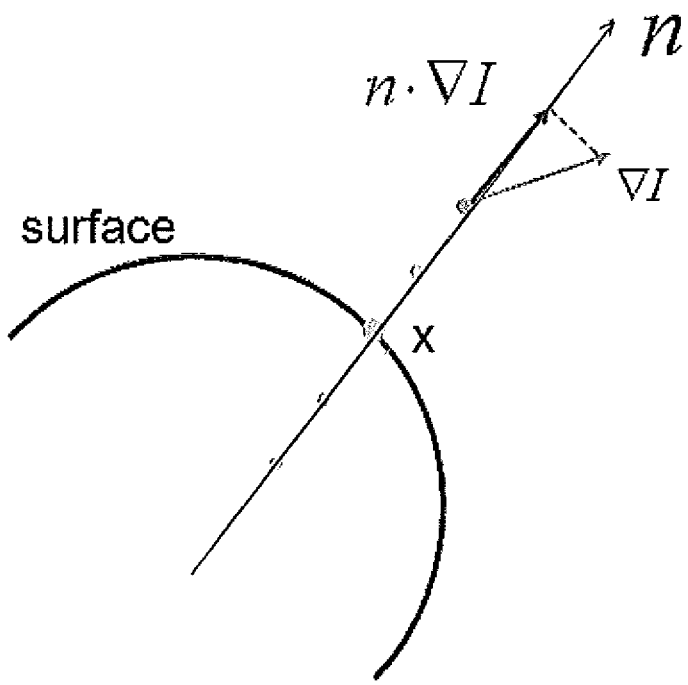
FIG. 1 is a diagram illustrating the feature sampling and calculating according to exemplary embodiments of the present disclosure.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Exemplary embodiments of the present invention seek to provide an approach for automatically segmenting and/or identifying one or more vertebra within a digital medical image. The following description refers primarily to thoracic vertebrae, which are readily visible in digital images during lung examinations. However, the systems and methods of the present disclosure can be readily extended and applicable to cervical and lumbar vertebrae.

In order to accomplish the accurate and efficient automatic segmentation and identification of vertebrae in the present disclosure, a learning-based bone structure edge detection algorithm is employed including efficient and effective gradient steerable features and robust training data sampling. Additionally, a hierarchical coarse-to-fine deformable surface based segmentation method is provided based at least in part on the response maps from the learned edge detector. An efficient vertebra identification method and system is described using mean vertebral shapes to identify imaged vertebrae.

Due to complex neighboring structures around vertebrae as well as imaging noise, common edge detectors such as a Canny operator, often produce detected edges that are leaking and spurious. In accordance with aspects of the present disclosure, a learning-based object specific edge detection algorithm is provided to achieve robust edge detection. This algorithm is similar to semantic object-level boundary lineation in natural image, as described for example in Dollar, P., Tu, Z., Belongie, S.: *Supervised Learning of Edges and Object Boundaries*. In: CVPR (2006), which is incorporated by reference herein in its entirety.

The learning-based edge detection of the present disclosure was developed by supervised bone edge detection. Twelve thoracic vertebrae were manually segmented from twenty CT volumes for training. Corresponding triangulated surfaces were generated using a Marching Cube algorithm, with approximately 10,000 triangular faces per vertebra model. Along the normal direction of the vertebral bone boundary, intensity values roughly formed a ridge pattern. The edge detection of the present disclosure is designed to describe the characteristics of boundary appearance, which allows for statistical training.

As shown in FIG. 1, for each triangle face of the surface mesh, five points are sampled (called a sampling parcel) along the face normal direction at one voxel intervals. Specifically, given a point x on the normal line and n the normal vector, the sampling parcel associated with x is:

$$P(x)=\{(x-2n, x-n, x, x+n, x+2n)\}$$

For each of the five sampling points three features are computed: Intensity I, projections of gradient onto the normal direction $\nabla 1I \cdot n$, $\nabla 2I \cdot n$, where $\nabla 1I$ and $\nabla 2I$ are gradient vectors computed using a derivative of Gaussian with two different kernel scales. In total, the feature vector of a point x, denoted by F(x) has fifteen elements:

$$F(x)=\{I(y), \nabla 1I(y) \cdot n, \nabla 2I(y) \cdot n / y \in P(x)\}$$

FIG. 1 illustrates the sampling parcel and its associated features. The steerable features are oriented-gradient pattern descriptor with simplified computation.

The vertebra edge detector is trained by training positive and negative boundary voxels obtained from manually segmented vertebra meshes as detailed below. For a triangle face center c, the boundary parcel is defined as $$P(c)=(c-2n, c-n, c, c+n, c+2n)$$

and the interior parcel is defined as $$P(c-3n)=\{c-5n, c-4n, c-3n, c-2n, c-n\}$$

and the exterior parcel is defined as $$P(c+3n)=\{c+n, c+2n, c+3n, c+4n, c+5n\}$$

Figure 2:
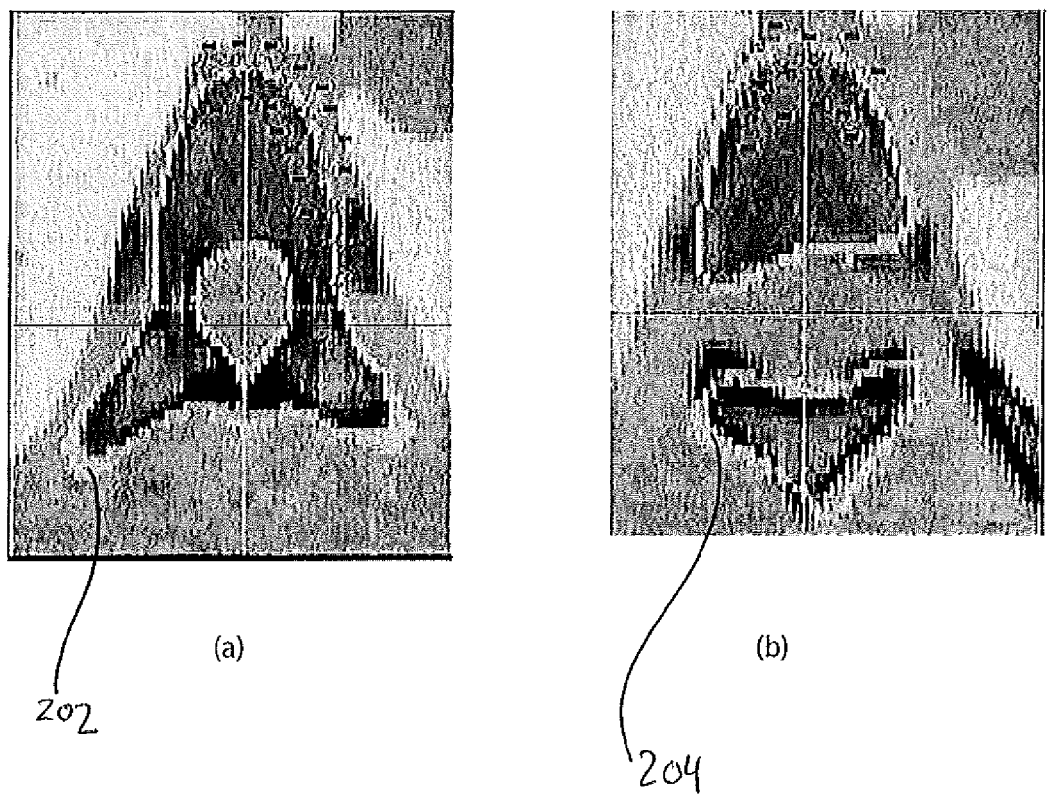
FIGS. 2A-C illustrate the application of surface templates to imaged vertebrae in accordance with aspects of the present disclosure.

That is, the interior parcel is three voxels away backward from the boundary parcel while the exterior parcel is three voxels forward, where three is adjustable. The corresponding feature vectors F(c), F(c−3n), F(c+3n) can also be computed. F(c) is labeled as positive class (i.e., boundary), and both F(c−3n) and F(c+3n) are labeled as negative class (i.e., non-boundary) as illustrated in FIGS. 2A and 2B. Thus, each triangle face provides one positive data point and two negative data points. Given one vertebra surface mesh with approximately 10,000 faces, sufficient and adequate training feature vectors are obtained. Note that a single and unified bony edge detector will be learned for each of the vertebrae, described throughout as the twelve thoracic vertebrae. Implicit, object "inside-outside" learning is described in, for example, Zhan, Y., Shen, D.: *Deformable Segmentation of 3D Ultrasound Prostate Images Using Statistical Texture Matching Method*. IEEE Trans. on Medical Imaging (2006), which is incorporated herein by reference in its entirety. Compared with such implicit, object "inside-outside" learning, the boundary/non-boundary delineation strategy described herein directly focuses on modeling the runtime boundary localization process (i.e., explicitly moving towards classified boundary positives), and delivers higher precision. Additionally, in such "inside-outside" methods, the boundary has to be further inferred from the transition of (object) internal positives and external negatives which is not a trivial consideration.

The feature vectors depend on the normal direction of triangle faces so that the edge detector is sensitive to the initialization of the surface template. According to the systems and methods of the present disclosure, a selected surface template or model is first roughly registered with an image or set of images by automatic detection or manual alignment, thus the normal direction of the surface template or model can not perfectly coincide with the true bony normal. To make the detector more robust to mis-alignment errors and thereby make the later deformable model convergent, some "noisy" training samples are synthesized by stress testing. Particularly, some random disturbances were added to the orientations and scales of the template model so that the template surface model does not accurately overlap with the manual segmentation. Considering a similarity transform, a random number between 0.9 and 1.1 for each of the three scales, and a random angle between $-(\pi/10)$ and $(\pi/10)$ for each of the three orientation angles are used. The true boundary parcels, as well as interior and exterior parcels are defined using ground truth positions but with disturbed template surface normals as shown in FIG. 2B. The corresponding feature vectors are consequently calculated (with the disturbed face normals) and added into the training sets. The random disturbance process is repeated 10 times for each training mesh to guarantee enough noisy samples. A linear or quadratic discriminant (LDA, QDA) classifier is trained based on the combined non-disturbed and disturbed feature vectors. Both LDA and QDA were evaluated and it was determined that LDA yields more robust results. Experiment results are computed using LDA. Finally, given a voxel x and its feature vector F(x), the classifier will assign a value $L(x) \in [0, 1.0]$ which indicates the likelihood of x being a boundary point.

In accordance with aspects of the present disclosure, in order to accurately and efficiently segment a digital image of one or more vertebra, an image or a series of images of an anatomical structure, in this case a vertebra are acquired. A system automatically locates at least one and preferably at least three anatomical landmarks within the image and selects a template from a database of pre-defined templates based at least in part on the identified anatomical landmarks. The system can optionally apply a series of rigid transformations to the selected template and continually calculate response values in order to better fit the template to the anatomical structure in the image. In accordance with the present disclosure, the system then applies a coarse segmentation to the image followed by a fine segmentation. After each segmentation step, the system can run a smoothing operation such as a Gaussian smoothing in order to smooth out any disturbances caused by the coarse or fine segmentation operations.

Figure 2C:
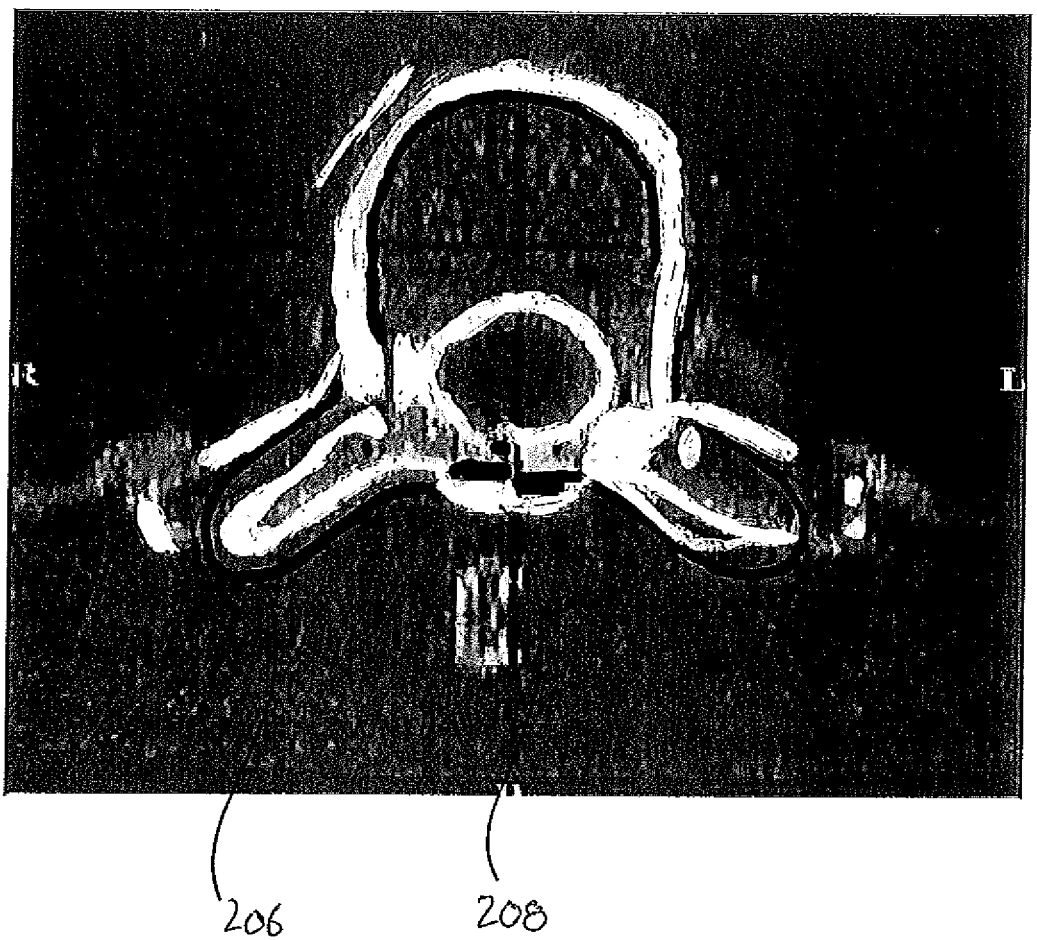

The main idea of segmentation is to deform the surface template mesh towards boundary points detected by the learned edge detector. After the surface template is initially positioned into a new volume, (the template can be initialized using strategies similar to marginal space learning) the edge detector calculates the edge likelihoods L(x) for voxels along the normal directions of all mesh faces, where a response map can be generated. As shown in FIG. 2C the response map is informative but unavoidably noisy. To guarantee the surface shape topology and smoothness during deformation/segmentation, the present disclosure employs a hierarchical deformation scheme of first performing a coarse deformation of sub-regions of the vertebra, then performing a fine segmentation of a multitude of patches. Patches are referred to indicate that points in the same neighborhood move together during fine segmentation.

As shown in FIG. 2A, a surface template 202 is perfectly aligned with the true boundary of the vertebra. FIG. 2B illustrates a surface template 204 that is mis-aligned. Plus and minus signs in FIG. 2B illustrate positive and negative samples, respectively. FIG. 2C illustrates a response map of vertebra edge detection in the section view of a 3D CT volume. Template surface 206 is shown in partial alignment with the voxels identified as boundary points, shown as line 208.

Figure 3:
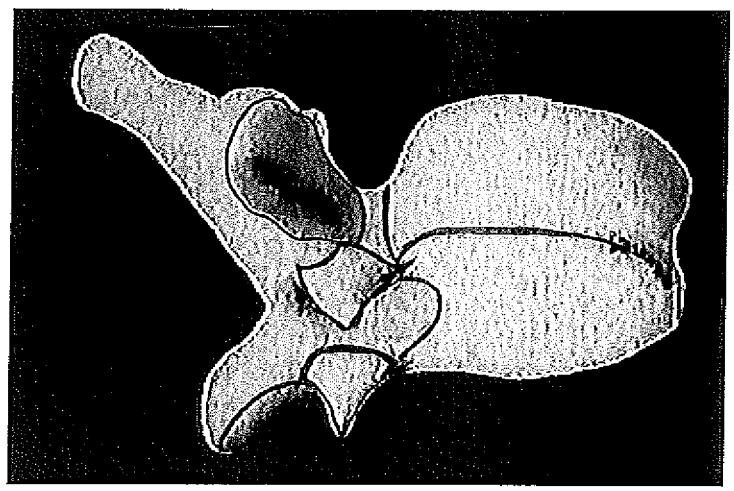
FIG. 3 illustrates exemplary sub-regions of a vertebra surface in accordance with an aspect of the present disclosure.
Figure 4:
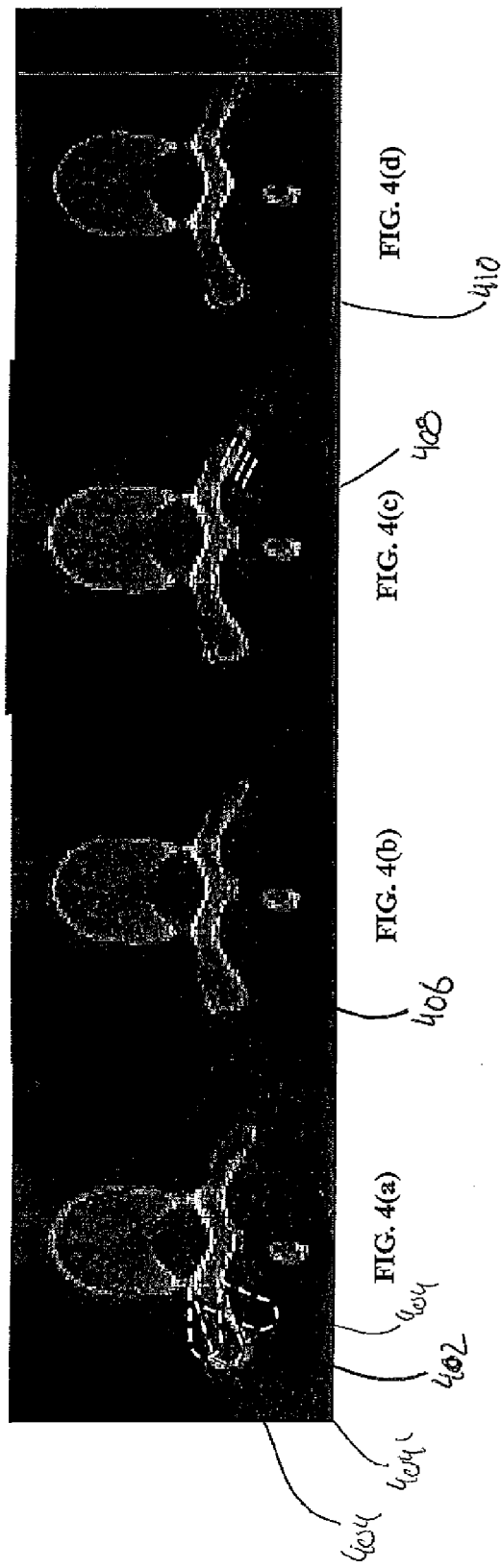
FIGS. 4A and 4B illustrate application of a coarse segmentation to a vertebra image in accordance with an aspect of the present disclosure.
FIGS. 4C and 4D illustrate application of a fine segmentation to a vertebra image in accordance with an aspect of the present disclosure.

Each vertebra is divided into 12 sub-regions, as shown in FIG. 3. In order to maintain the shape of these sub-regions, a similarity transformation to each sub-region is applied such that the total response of edge detection is maximum in the transformed configuration. For a sub-region S and some face center f on it, systems and methods in accordance with the present disclosure calculate a similarity transformation T satisfying $$\hat{T} = \underset{T \in \mathcal{T}}{\operatorname{argmax}} \sum_{f \in S} \mathcal{L}(T(f))$$

where T is the set of similarity transformations $\mathcal{T}$. Searching the optimal T involves the 9-dimensional parameters of (Tx, Ty, Tz, Sx, Sy, Sz, θx, θy, θz). In order to perform an exhaustive search with five grid steps for each parameter would require a possible $5^9$ transformations which is computationally infeasible. Therefore, systems and methods in accordance with the present disclosure reduce the search space by performing a three-stage search. First a search for (Tx, Ty, Tz) is completed with displacement $\{-4, -2, 0, 2, 4\}$ voxels for each translation. Second, with fixed (Tx, Ty, Tz), the system searches for (Sx, Sy, Sz) with discretization grids of $\{0.8, 0.9, 1.0, 1.1, 1.2\}$ for each scaling. Third, with fixed optimal translation and scaling, the system searches for (θx, θy, θz) with intervals of $\{(-\pi/10), (-\pi/20), 0, (\pi/20), (\pi/10)\}$ for each orientation. In this way, the system only needs to consider $5^3*3$ or 375 possible poses and select the one with the strongest response as T. This heuristic searching strategy turns out to be effective in capturing the true pose of sub-regions though it might be sub-optimal because the optimal search is computationally unrealistic. FIG. 4A illustrates the coarse segmentation search process graphically. Template sub-region 402 is deformed to deformed sub-region templates 404, including optimal deformed sub-region template 404'.

After the optimal similarity transformation is found for each sub-region, a smooth deformation of the whole surface can be obtained using simple Gaussian smoothing. For example, let $S_1, S_2, S_{12}$ denote the twelve sub-regions of a vertebra, and $T_1, T_2, \ldots, T_{12}$ be the corresponding optimal transform. Denote an arbitrary vertex v in the template surface and u a vertex in a certain sub-region. Then the new position of v is $$v' = v + \lambda \sum_{i=1}^{12} \sum_{w \in S_i} (T_i(w) - w) K(w - v)$$

where $$K(x) = e^{-\frac{x^2}{2\sigma^2}}$$

is the Gaussian kernel and λ is a regulation parameter. FIG. 4B illustrates the final result of the coarse segmentation or "deformation of sub-region" stage of the method of the present disclosure. The surface mesh 406 is more closely aligned with the true boundary through articulated similarity maneuvers, although in several areas, the surface mesh 406 still has a certain distance from the true boundary. This distance will be corrected by the fine segmentation step that follows.

After the coarse segmentation, or deformation of sub-regions, the surface mesh or surface template is in approximately overlapping position with the vertebra's boundary in the exemplary CT volume as shown in FIG. 4B. Next, according to the methods of the present disclosure, a fine segmentation is performed. Unlike the coarse segmentation that divides the surface mesh or template into twelve sub-regions, the fine segmentation divides the template into 200 patches or local neighborhoods for each vertebra mesh surface. Each patch contains approximately 50 mesh faces. For each patch (denoted as PT), its mean normal is computed as:

$$\bar{n} = \frac{1}{N} \sum_{f \in PT} n(f)$$

where f is a face in the patch and n(f) is the unit normal of the face. Then the patch is moved along its mean normal direction in search of the strongest or highest response. That is, systems and methods in accordance with the present disclosure seek to optimize this term:

$$\hat{i} = \underset{i}{\operatorname{argmax}} \sum_{f \in S} \mathcal{L}(f + i\bar{n})$$

where the search range is limited in i=−6, −5, . . . , 5, 6. FIG. 4C illustrates graphically how a single patch 408 (enlarged for purposes of illustration) is displaced along its mean normal direction in search of the true boundary. After all patches have been deformed and optimized at their optimal displacement, the system can perform a smooth deformation again by Gaussian smoothing. FIG. 4D illustrates the segmentation result following both the coarse and fine segmentation steps as well as smoothing operations after each of the segmentation steps.

As is visible in FIG. 4D, the surface mesh or template accurately captures the true boundary of the vertebra. The two-stage, coarse-to-fine deformation of surface model template guarantees the accuracy of segmentation as well as the smoothness of the shapes, using articulated similarity transforms and non-rigid transforms respectively.

In order to identify an imaged vertebra automatically, the above described segmentation algorithm was applied for training purposes to 40 volumes at 1 mm by 1 mm by 1 mm resolution and approximately 15-20 surface meshes were obtained per thoracic vertebra. Vertex correspondence across meshes for each vertebra is also directly available since surface meshes are deformed by the same template. Therefore, the system of the present disclosure can compute the mean vertebra shapes by taking the arithmetical mean of corresponding vertices' positions. There are 12 thoracic vertebrae, namely T1, T2, . . . , T12. Vertebra identification is to label a segmented vertebra to be one of the twelve. In this context, given a single vertebra subvolume, a system in accordance with the present disclosure carries out the identification process by testing which mean shape has the maximum response to an imaged vertebra. The twelve mean vertebral shape models are applied to an imaged vertebra one after the other in order to calculate the supervised edge response scores without any deformation. The mean shape with the strongest response is assigned as the label of that vertebra.

Let $M_1, M_2, \ldots, M_{12}$ denote the twelve mean shapes and f is an arbitrary face center in the mean shapes. One way to calculate the responses is to compute the overall likelihood of boundary $$\hat{i} = \arg\max_i \sum_{f \in M_i} \mathcal{L}(f)$$

Another way is to count the number of faces with high probability to be boundary points, $$\hat{i} = \arg\max_i \sum_{f \in M_i} 1_{\mathcal{L}(f) > \alpha}$$

were $\alpha$ is a threshold. The present disclosure allows for either of the above calculation methods, but the second method proves more robust against outliers and imaging noise by tolerating up to $(1-\alpha)$ portion of data being polluted or not at the correct spatial configuration, and take $\alpha=0.8$ which is used for the experimental results detailed below.

Additionally, the identification method described above can be extended to multiple vertebrae, i.e., a vertebra string. By using more vertebra and therefore more information, multiple vertebral identification further increases the accuracy of identification.

Results

Figure 5:
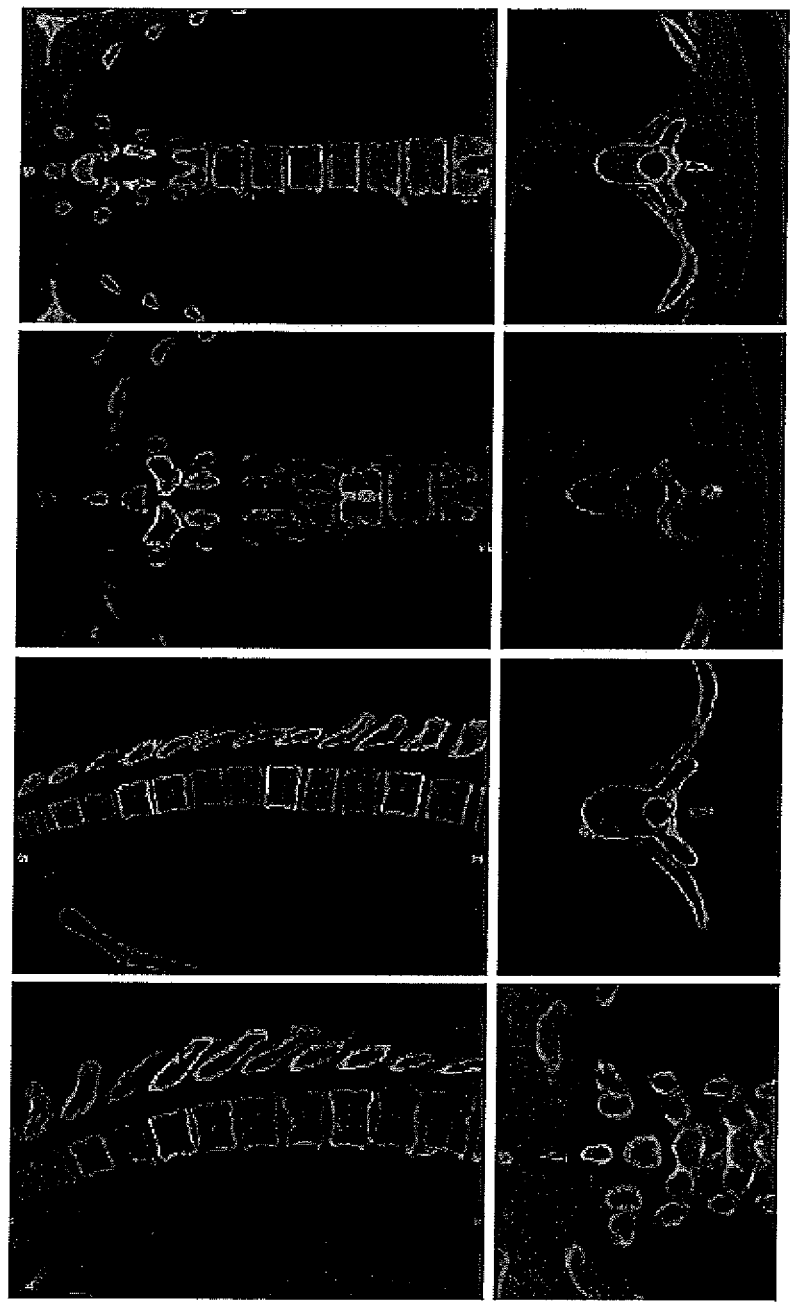
FIG. 5 illustrates exemplary segmentation results in axial, sagittal and coronal views in accordance with an aspect of the present disclosure.

In experimental testing, the above-described automatic segmentation algorithm was applied to 40 volumes of thoracic scans and evaluated using four-fold cross validation. In implementation, the sub-region deformation step (coarse segmentation) was run multiple (m) times followed by patch-based deformation (fine to segmentation) being run n times, where m and n are empirically optimized to be 3 and 4, respectively. Supervised edge detection is performed in each iteration to reflect the runtime vertebra mesh surface configuration. FIG. 5 shows examples of segmentation in axial, sagittal, or coronal view, for visual inspection. To quantitatively evaluate the segmentation algorithm, the distance of a vertex on the fitted mesh to the closest mesh point (not necessarily a vertex) of the ground truth is used. The ground truth mesh is generated by manual segmentation for experimental evaluation purposes. The mean point-to-surface error and the standard deviation for individual vertebra is shown in Table 1 below. Highly reliable and accurate segmentation results were shown in the evaluation of the systems and methods of the present disclosure, with the overall final mean error of 0.95+/−0.91 mm.

Figure 6B:
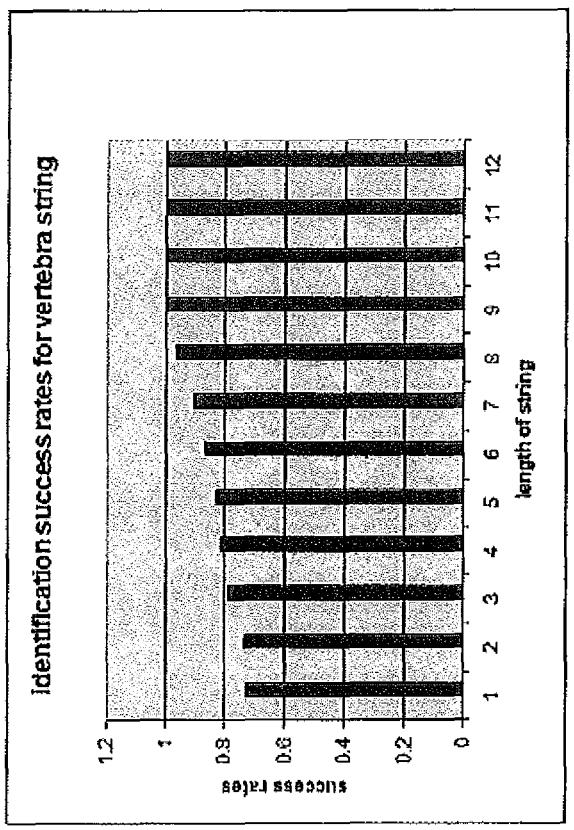
FIGS. 6A and 6B show successful vertebra identification rates when identifying a single vertebra and a string of vertebrae, respectively, in accordance with an aspect of the present disclosure.
Figure 6A:
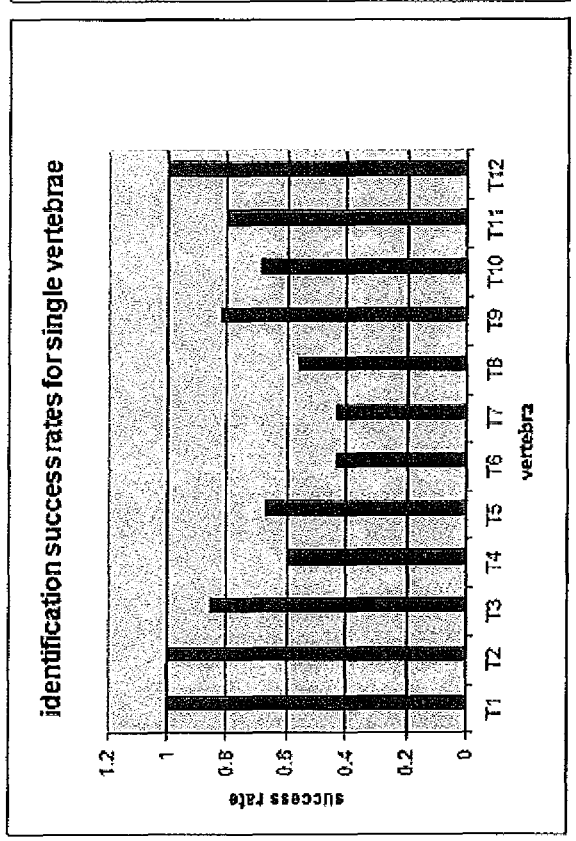

For identification, the systems and methods of the present disclosure have an average success rate of 73.1% using a single vertebra. This success rate can vary from one specific vertebra to another where the rates for T5, T6, T7, and T8 are less than 60% because these four vertebrae are so physically similar to one another. However, when exploiting the systems and methods of the present disclosure to identify a string of vertebrae, the success rate improves significantly as the string grows in length. With a string of 9 or more vertebrae, the success rate is over 91%. The success rates for individual and stringed vertebra identification according the present disclosure are comparable or better than those achieved using prior art intensity based matching. The success rates for identification according the present disclosure are shown in FIGS. 6A and 6B.

The identification method of the present disclosure appears simpler and is in fact computationally significantly simpler, saving substantial time and computing power. This is due to the fact that previous methods employ intensity based matching or volumetric mean appearance models for vertebra identification. However, it was determined that though such methods might appear to be more robust, the variability of neighboring structures is so significant in patients that adjacent vertebrae can be so close to one another as to hide the boundary between them. Likewise adjacent vertebrae may appear so far apart that the prior art systems misinterpret the information. The method of the present disclosure determines identification based solely on the clean shape model without surrounding structures and therefore avoids such real-world pitfalls.

Figure 8:
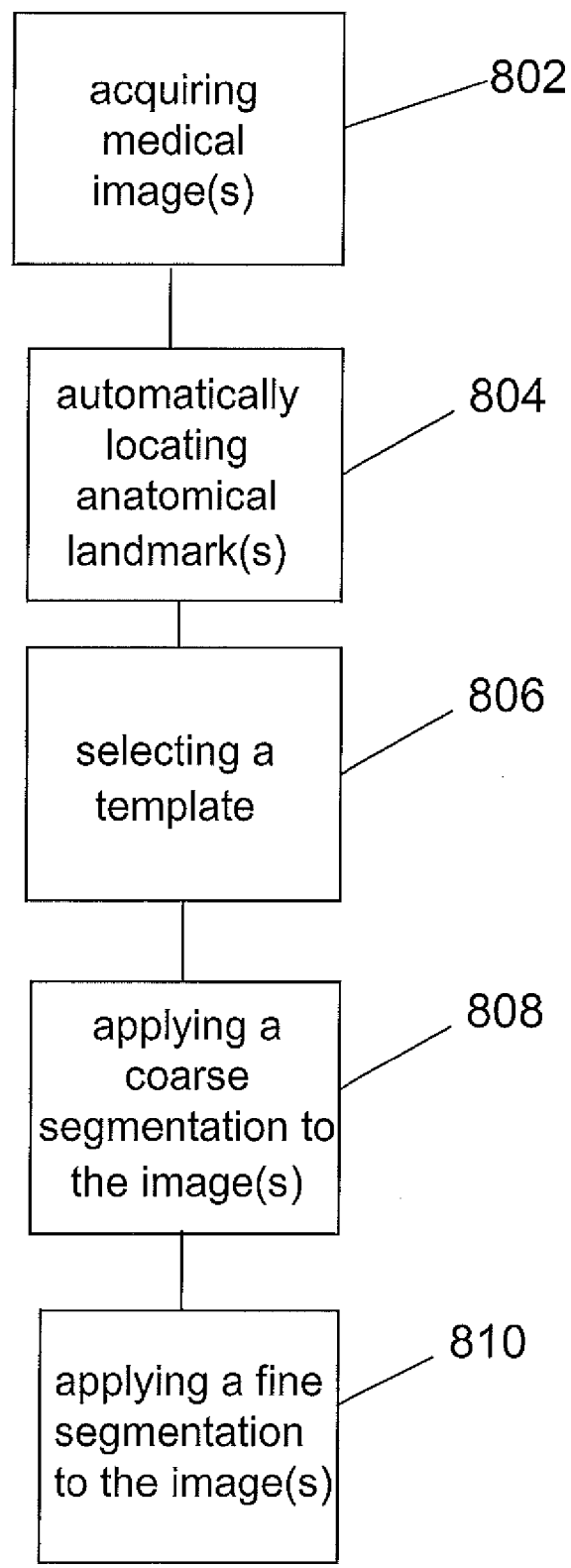
FIG. 8 is a flow chart illustrating a method for vertebra segmentation according to an exemplary embodiment of the present disclosure.

FIG. 8 illustrates an exemplary flow of steps in the method of the present disclosure for segmenting an image including acquiring medical image(s) at step 802, automatically locating anatomical landmark(s) at step 804, selecting a template at step 806, applying a coarse segmentation to the image(s) at step 808, and applying a fine segmentation to the image(s) at step 810.

Figure 9:
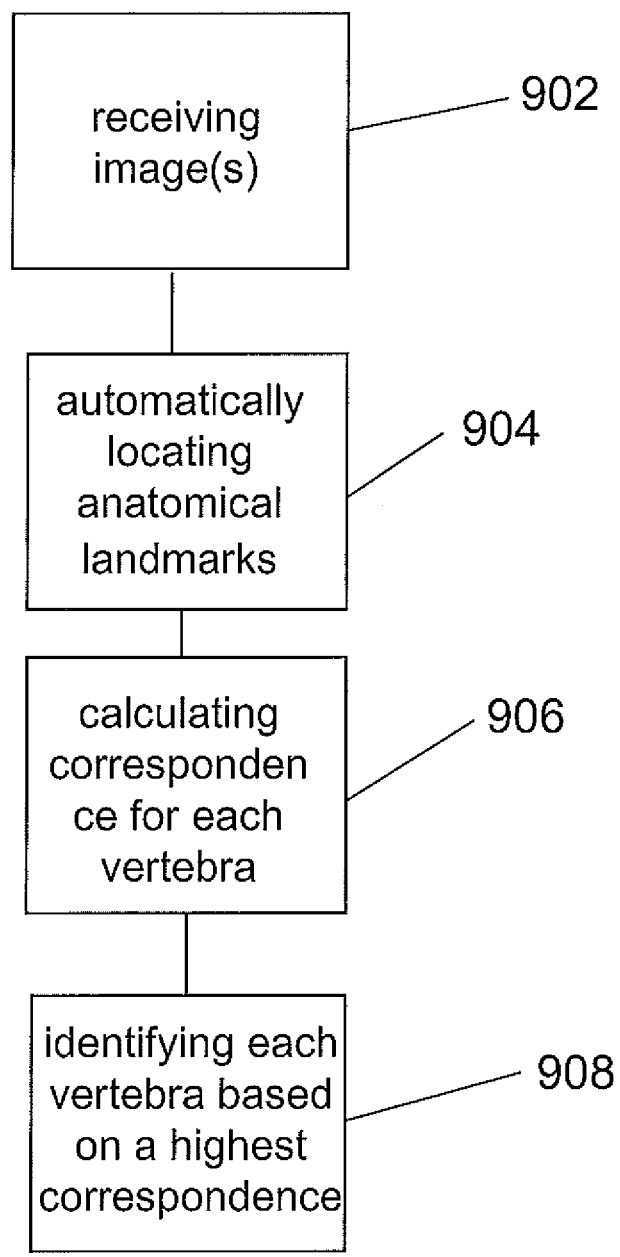
FIG. 9 is a flow chart illustrating a method for vertebra identification according to an exemplary embodiment of the present disclosure.

FIG. 9 illustrates an exemplary flow of steps in the method of the present disclosure for identifying a vertebra including receiving image(s) at step 902, automatically locating anatomical landmarks at step 904, calculating correspondence for each vertebra at step 906, and identifying each vertebra based on a highest correspondence at step 908.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture. The system and method of the present disclosure may be implemented in the form of a software application running on a computer

TABLE 1

| | vertebra | | | | | | | | | | | |
|---|---|---|---|---|---|---|---|---|---|---|---|---|
| | T1 | T2 | T3 | T4 | T5 | T6 | T7 | T8 | T9 | T10 | T11 | T12 |
| mean error (mm) | 1.05 | 1.11 | 1.03 | 0.93 | 0.99 | 0.92 | 0.83 | 0.75 | 0.89 | 0.79 | 0.94 | 1.21 |
| std deviation (mm) | 0.96 | 0.97 | 1.04 | 1.03 | 1.31 | 0.92 | 0.56 | 0.59 | 0.68 | 0.50 | 0.63 | 1.16 | system, for example, a mainframe, personal computer (PC), handheld computer, server, etc. The software application may be stored on a recording media locally accessible by the computer system and accessible via a hard wired or wireless connection to a network, for example, a local area network, or the Internet.

Figure 7:
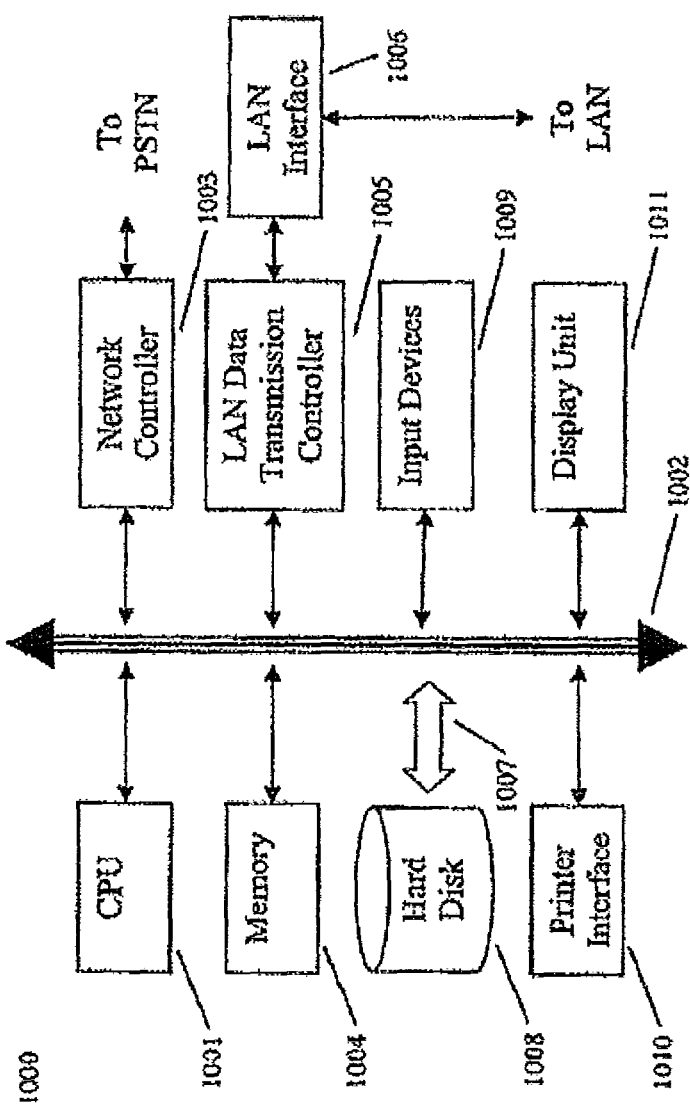
FIG. 7 shows an example of a computer system capable of implementing the method and system according to embodiments of the present disclosure

FIG. 7 shows an example of a computer system which may implement a method and system of the present disclosure. The computer system referred to generally as system 1000 may include, inter cilia, a central processing unit (CPU) 1001, memory 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The memory 1004 can include random access memory (RAM), read only memory (ROM), disk drive, tape drive, etc., or a combinations thereof. The present invention can be implemented as a routine that is stored in memory 1004 and executed by the CPU 1001. As such, the computer system 1000 is a general purpose computer system that becomes a specific purpose computer system when executing the routine of the present invention.

The computer system 1000 also includes an operating system and micro instruction code. The various processes and functions described herein can either be part of the micro instruction code or part of the application program or routine (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for automated segmentation of anatomical structures in image data comprising:
    a digital image input for receiving at least one digital image of an anatomical structure and;
    a storage device, coupled to the image input for storing the at least one digital image; and
    a processor coupled to the storage device and configured to:
    receive the at least one digital image;
    analyze the at least one digital image and automatically locate at least one anatomical landmark;
    select a template from a database of pre-defined templates based upon the at least one anatomical landmark;
    segment the at least one digital image by applying a coarse segmentation and a fine segmentation to obtain an optimized segmented template,
    wherein applying the coarse segmentation comprises, for each of a plurality of sub-regions of the anatomical structure, applying a corresponding sub-region of the selected template to the anatomical structure, calculating a first edge response, deforming the sub-region of the selected template, calculating a deformation edge response, selecting the sub-region or deformed sub-region of the template having a highest edge response, and combining the highest edge-response sub-region from each of the plurality of sub-regions into a single coarse-segmented template,
    wherein applying the fine segmentation comprises, for each of a plurality of patches of the coarse-segmented template, calculating an edge-response of the patch relative to the anatomical structure, deforming the patch, calculating an edge-response of the deformed patch, selecting the patch or deformed patch having a highest edge-response, and combining the highest edge-response patches into a single optimized segmented template.

2. The system of claim 1, wherein the at least one digital image comprises at least one three-dimensional (3D) image, and the template comprises a 3D surface template.

3. The system of claim 1, wherein receiving the at least one digital image further comprises acquiring the at least one digital image using an imager selected from: computer tomography (CT), positron emission tomography (PET), single photon emission computed tomography (SPECT), magnetic resonance (MR), and ultrasound.

4. The system of claim 1, wherein the processor being configured to select a template further comprises the processor being configured to:
    select a template from a database of pre-defined templates based upon the at least one anatomical landmark;
    perform a plurality of rigid transformation on the selected template;
    calculate a fit response for each transformed template; and
    select a transformed template having a highest fit response.

5. The system of claim 1, wherein deforming the template further comprises:
    performing a plurality of translations of the template along each of the x, y, and z axes;
    performing a plurality of re-scalings of the template along each of the x, y, and z axes; and
    performing a plurality of rotations of the template along each of the x, y, and z axes.

6. The system of claim 1, wherein, subsequent to combining the highest edge-response sub-region from each of the plurality of sub-regions, the processor is further configured to perform a smoothing operation to smooth the single coarse-segmented template.

7. The system of claim 1, wherein deforming the patch further comprises:
    calculating a mean normal for the patch; and
    deforming the patch along the mean normal.

8. The system of claim 1, wherein, subsequent to combining the highest edge-response patches, the processor is further configured perform a smoothing operation to smooth the single optimized segmented template.

9. A method for automated segmentation of anatomical structures in image data, comprising:
    acquiring at least one medical image of an anatomical structure;

automatically locating at least one anatomical landmark in the at least one medical image;

selecting a template from a database of pre-defined templates based at least in part on the at least one anatomical landmark;

segmenting the at least one medical image by applying a coarse segmentation and a fine segmentation to obtain an optimized segmented template, wherein applying the coarse segmentation comprises, for each of a plurality of sub-regions of the anatomical structure, applying a corresponding sub-region of the selected template to the image of the anatomical structure, calculating a first edge-response, deforming the sub-region of the selected template, calculating a deformation edge-response, selecting the sub-region or deformed sub-region of the template having a highest edge-response, and combining the highest edge response sub-region from each of the plurality of sub-regions into a single coarse-segmented template, wherein applying a fine segmentation comprises, for each of a plurality of patches of the coarse-segmented template, calculating an edge-response of the patch relative to the anatomical structure, deforming the patch, calculating an edge-response of the deformed patch, selecting the patch or deformed patch having a highest edge-response, and combining the highest edge-response patches into a single optimized segmented template.

10. The method of claim 9, wherein the at least one digital image comprises at least one three-dimensional (3D) image.

11. The method of claim 9, wherein acquiring the at least one digital image comprises acquiring the at least one digital image using an imaging technique selected from: computer tomography (CT), positron emission tomography (PET), single photon emission computed tomography (SPECT), magnetic resonance (MR), and ultrasound.

12. The method of claim 9, wherein selecting a template further comprises:

selecting a template from a database of pre-defined templates based at least in part on the at least one anatomical landmark;

performing a plurality of rigid transformation on the selected template;

calculating a fit response for each transformed template; and selecting a transformed template having a highest fit response.

13. The method of claim 9, wherein deforming the template further comprises:

performing a plurality of translations of the template along each of the x, y, and z axes;

performing a plurality of re-scalings of the template along each of the x, y, and z axes; and performing a plurality of rotations of the template along each of the x, y, and z axes.

14. The method of claim 9, further comprising, subsequent to combining the highest edge-response sub-region from each of the plurality of sub-regions, performing a smoothing operation to smooth the single coarse-segmented template.

15. The method of claim 9, wherein deforming the patch further comprises:

calculating a mean normal for the patch; and deforming the patch along the mean normal.

16. The method of claim 9, further comprising, subsequent to combining the highest edge-response patches, performing a smoothing operation to smooth the single optimized segmented template.

\* \* \* \* \*